United States Patent [19]

Hutchins et al.

[11] Patent Number: 4,584,067

[45] Date of Patent: Apr. 22, 1986

[54] ETCHING OF ALUMINUM ELECTROLYTIC CAPACITOR FOIL

[75] Inventors: Clinton E. Hutchins, Pownal, Vt.; Derek E. Rougeau, Adams, Mass.; Thomas E. Chalmers, Clarksburg, Mass.; Richard A. Bemis, North Adams, Mass.

[73] Assignee: Sprague Electric Company, North Adams, Mass.

[21] Appl. No.: 706,816

[22] Filed: Feb. 28, 1985

[51] Int. Cl.$^4$ ............................................... C25D 5/44
[52] U.S. Cl. ................................. 204/33; 204/129.75; 252/79.1; 252/79.2; 252/79.4; 29/570; 156/665
[58] Field of Search ............................. 204/129.75, 33; 252/79.1, 79.2, 79.4; 29/570; 156/665

[56] References Cited

U.S. PATENT DOCUMENTS

| 2,154,027 | 4/1939 | Brennan | 148/8 |
| 2,171,545 | 9/1939 | Edwards et al. | 91/68 |
| 2,180,798 | 11/1939 | Collins | 148/8 |
| 2,556,626 | 6/1951 | Meulendyke | 252/79.2 |
| 2,699,382 | 1/1955 | Altenpohl | 41/42 |

FOREIGN PATENT DOCUMENTS

| 55-76073 | 6/1980 | Japan . |
| 55-115323 | 9/1980 | Japan . |
| 1247525 | 9/1971 | United Kingdom . |

Primary Examiner—R. L. Andrews

[57] ABSTRACT

Aluminum electrolytic capacitor foil is etched by first subjecting high-cubicity foil to a chemical etching stage in which the etchant is an acidic aqueous solution containing an acid having anions for anodizing aluminum, hydrochloric acid, transition metal ions, and aluminum ions. Preferably, the anodizing anions are present in a greater concentration than the chloride ions. The foil is then subjected to a second etching step which may be chemical or electrochemical. The process produces a high capacitance foil with high bend strength.

10 Claims, No Drawings

ETCHING OF ALUMINUM ELECTROLYTIC CAPACITOR FOIL

BACKGROUND OF THE INVENTION

This invention relates to the etching of high-cubicity aluminum electrolytic capacitor foil in which the foil is first subjected to chemical etching in an aqueous acidic solution containing an acid having anions capable of anodizing aluminum, hydrochloric acid, transition metal ions, and aluminum ions. Preferably, the anodizing ions are present in a greater concentration than the chloride ions. The foil is then subjected to a second etching step which may be electrochemical or chemical. A high capacitance foil with high bend strength is produced.

Chemial etching of aluminum capacitor foil is well-known. Generally, a hydrochloric or nitric acid solution has been used with or without transition metals as catalysts. These heavy metals may be present as chlorides, nitrates, or sulfates, and may accelerate the reaction, e.g., copper salts, or retard it, e.g., iron salts.

Multi-stage etching of capacitor foil is also well-known. Frequently, the process has been electrochemical using direct and/or alternating current. When direct current is used, the electrolyte is usually a sodium chloride solution which may be acidified and may contain additives. When alternating current is used, the electrolyte is generally hydrochloric acid containing small amounts of additives such as phosphates, sulfates, tartrates, oxalates, etc.

The etch structure produced is different with each process. Chemical etching produces long straight tunnels along the [100] crystallographic direction within the aluminum foil, and these tunnels keep going in the same direction. Direct-current etching produces a branched tunnel structure reminiscent of a jungle gym with many right-angle bends in the tunnels, particularly for foils to be used at higher voltages (above 100 V). Alternate-current etching gives a completely different etch structure. It is more pitted, and the structure is reminiscent of grape clusters or cauliflower flowerets.

As the purity of aluminum increases, it is much more difficult to etch. Chemical etching of high purity foil became more difficult and, in general, it was suitable for foil intended for low-voltage use (100 V or less) which did not require etching to any great depth. Direct current etching is an easier process to control than a chemical etching process for any voltage range, and it produces a high surface area product for high-voltage use even with high-purity foil which had not been obtainable with a chemical etch heretofore. Initially, alternate current etching was used mainly for low-voltage foil. It gives a greater density of etch sites than direct current etching and frequently has been combined with it to provide a high surface area foil.

High-cubicity aluminum foil is foil in which the majority of the aluminum grains are in the [100] direction perpendicular to the foil surface. This orientation provides the possibility of producing a fairly homogenous chemical etch structure with a high density of parallel tunnels perpendicular to the foil surface. High-cubicity foil has been etched successfully using direct current, but the resulting etch structure shows etch tunnels many of which have numerous right-angle bends in the tunnels and some of which penetrate completely through the foil.

SUMMARY OF THE INVENTION

This invention relates to the etching of high-cubicity aluminum electrolytic capacitor foil in which the foil is first subjected to chemical etching. The chemical etchant is an acidic aqueous solution containing an acid having anions capable of anodizing aluminum, hydrochloric acid, transition metal ions, and aluminum ions. Preferably, the anodizing anions are present in greater concentration than the chloride ions. The anodizing ions are preferably sulfate or phosphate and are derived from sulfuric or phosphoric acid, respectively. The foil is then subjected to a second etching step which may be chemical or electrochemical.

A high capacitance foil with high bend strength is produced in this process as the chemical etching produces a high density of straight parallel tunnels perpendicular to the foil surface, i.e., along the [100] direction of aluminum. These tunnels typically penetrate 30 to 40% of the foil thickness from each side and leave an unetched aluminum core which gives the etched foil its high bend strength.

The second-stage etch, even when direct current is used, serves mainly to enlarge these already formed tunnels, although there may be some penetration. This is in contrast to a straight DC etch in which the tunnel density is not as great, and the tunnels often have right-angle bends while many others penetrate completely through the foil which results in a poorer bend strength.

The aluminum ions are added to the form of chloride or sulfate and are present initially in a concentration of at least 0.2 mole/liter aluminum ion to reduce the known induction period and control etch initiation. Since aluminum ions are produced in the process, their concentration will increase during the course of the etching. Because of waste treatment and recycle considerations, it is preferable to operate at as high an aluminum concentration as possible without forming a sludge or "mud".

The transition metal is preferably a copper(II), nickel(II), or cobalt(II) compound with nickel the preferred metal. The chloride or sulfate salt is preferably used to provide 10 to 2000 mg/l transition metal concentration.

This process is particularly designed to etch high-cubicity aluminum foil for high-voltage use, e.g., above 100 V and specifically above 250 V. In the first state chemical etch, tunnels are produced which run in the [100] direction and, because of the orientation in this type of foil, are approximately perpendicular to the foil surface. In this first stage, weight loss should be between 5 and 25 wt % to obtain both high capacitance and good foil strength, with the best results occurring at 18 to 24 wt % when etching 4 mil thick foil.

The second etching step may be chemical or electrochemical and serves to widen the tunnels produced in the first stage. Total weight loss from both stages can vary greatly, e.g., 20 to 50 wt %, with good results providing the first-stage weight loss is kept within the above limits.

Foil from different suppliers etches differently although all are the same purity. The concentration of the anodizing anion acid and the hydrochloric acid can be kept at approximately the same levels, e.g., within 2.5% for sulfuric or phosphoric acid and within 5% for hydrochloric acid. However, the concentration of the transition metal varies widely, e.g., 10 to 2000 mg/l depending on the metal and between 300 and 1200 mg/l when the metal is nickel.

The first stage temperature is adjusted between 70° C. and the boiling point of the etch solution, preferably 85° to 95° C., to provide a stable etch time of sufficient length so that small time variations will not cause large weight loss difference which, in turn, produce different foil strengths and capacitances. The more reactive foils are etched at a lower temperature or shorter time than the less reactive ones. Second-stage temperature is not nearly as critical.

Another factor which influences the first stage chemical etch conditions is initial foil thickness. Thicker foil has a greater strength than thinner foil so that etching conditions can be more severe for a given time period while still retaining foil strength and capacitance.

As noted above, the second stage may be electrochemical or chemical. When it is electrochemical, a direct current process is preferred using an aqueous chloride electrolyte, e.g., hydrochloric acid or alkali metal or alkaline earth metal chloride. When a chemical etch is used, good results have been obtained using 0.5 to 6.0M nitric acid containing 0 to 200 mg/l transition metal. Second stage temperature is generally between 70°0 C. and the boiling point of the solution.

DESCRIPTION OF THE PREFERRED EMBODIMENTS

High-cubicity aluminum foil for high voltage use is produced by first etching the foil chemically to obtain a weight loss of 5 to 25 wt %, preferably 18 to 24 wt %, and then etching it either chemically or electrochemically to a total weight loss of 20 to 50 wt %.

In the first-stage, the etchant is preferably an aqueous acidic solution containing 1.4 to 2.3 moles/liter of sulfuric or phosphoric acid, 1.1 to 1.7 moles/liter of hydrochloric acid, initially at least 0.2 moles/liter of aluminum ion, preferably as sulfate, and 10 to 2000 mg/l transition metal ions, preferably about 300 to 600 mg/l nickel(II) ions present as the sulfate or chloride.

The examples below show the differences in foil from different suppliers etched in the same etchant, the effect of varying the two main first stage etchant reagents, and the use of either a chemical or electrochemical etch in the second etching stage.

EXAMPLE 1

In this example, high-cubicity 4 mil thick foils from two different suppliers were etched using 1.76M sulfuric acid, 1.28M hydrochloric acid, 0.15M aluminum sulfate (to provide 0.3M aluminum ion initial concentration) and about 400 mg/l Ni(II) ions at 90° C. The second stage was also a chemical etch using 0.6M nitric acid and about 10 mg/l copper(II) ion, and this solution was at its boiling point.

TABLE 1

| | 280 Vf | | 615 Vf | | |
|---|---|---|---|---|---|
| Supplier | Cap, $\mu F/in^2$ | Ave. Bends | Cap, $\mu F/in^2$ | Ave. Bends | Wt. Loss |
| 1 | 6.73 | 5 | 1.93 | 3.5 | 44% |
| 1 | 6.70 | 3 | 1.89 | 2.25 | 44% |
| 2 | 6.79 | 2 | 2.00 | 1.90 | 41% |

Although the capacitance (measured in microfarads per square inch of foil area) at 280 and 615 volt formations did not vary too much between suppliers, average weight loss and foil strength did (average number of 90° Bends until the sample broke).

EXAMPLE 2

In this example, 4 mil thick foil from supplier 1 was etched varying the sulfuric and hydrochloric acid concentrations in the first stage. The initial aluminum ion concentration was 0.3M (added as sulfate), and 600 mg/l nickel (added as chloride) was present. The temperature was 90° C., and the time in seconds varied as shown to maintain about 20% weight loss in the first stage. The same second state chemical etch solution was used as in Example 1, but the solution temperature was 70° C. and etch time was 6 min. Capacitance in $\mu F/in^2$ is shown for 280 V formation together with final foil thickness in mils, number of bends until fracture, and weight loss in the first stage and total weight loss. Sulfuric and hydrochloric acid concentration are in moles/liter.

TABLE 2

| Sample | $H_2SO_4$ | HCl | Thickness | Time | Wt. loss, % 1st | Total | Bends | Cap. |
|---|---|---|---|---|---|---|---|---|
| 1 | 1.75 | 1.28 | 3.90 | 80 | 20.1 | 30.3 | 12 | 7.16 |
| 2 | 1.75 | 0.96 | 3.96 | 165 | 18.5 | 30.3 | 1 | 7.01 |
| 3 | 1.75 | 1.60 | 3.82 | 35 | 20.6 | 30.2 | 12 | 3.32 |
| 4 | 1.31 | 1.28 | 3.94 | 150 | 20.5 | 28.2 | 1 | 5.70 |
| 5 | 2.19 | 1.28 | 3.87 | 55 | 19.8 | 33.3 | 10 | 6.55 |

Lowering the sulfuric acid concentration by 25% doubled the first-stage etch time, reduced capacitance, and produced a brittle foil. Increasing it by 25% reduced etch time by 30%, reduced capacitance, and slightly decreased foil strength. Lowering the hydrochloric acid concentration by 25% doubled the first-stage etch time, slightly reduced capacitance, and produced a brittle foil. Increasing it by 25% produced severe macrothinning of the foil but did not affect strength and drastically reduced capacitance.

EXAMPLE 3

In this example, direct current etching was used in the second stage. The electrolyte was 0.5M sodium chloride, current density was 0.6A/in$^2$, and the temperature was 85° C. In the first stage the conditions were: 1.76M sulfuric acid, 1.2M hydrochloric acid, 0.15M aluminum sulfate, 600 mg/l nickel, 90° C., and an etch time of 65–85 seconds.

First stage etching was carried out to weight losses of 7 to 31% with etching continued in the second stage to provide 22 to 46% total weight loss. At the low end of the range, capacitance was lowest and bend strength highest while at the high end of the range, capacitance was highest and bend strength lowest for a given foil and at a given amount of charge passed. Second stage weight loss was controlled by the amount of charge passed. Thus, it is possible to adjust the second stage conditions to provide the highest capacitance for a given bend strength.

Further experimentation on foils from other vendors showed that the sulfuric or phosphoric acid and hydrochloric acid concentations can remain fairly constant but that the transition metal concentration varies widely with different foil sources. This variation appears to be caused by variations in types and relative amounts of metallic impurities in the greater than 99.93% purity aluminum foil.

What is claimed is:

1. A process for etching aluminum electrolytic capacitor foil comprising subjecting a high-cubicity foil to at least one chemical etching stage by passing said foil through a strongly acidic aqueous solution containing 1.4 to 2.3 moles/liter of an acid having anions capable of anodizing aluminum, 1.1 to 1.7 moles/liter of hydrochloric acid, an initial concentration of at least 0.2 mole/liter of aluminum ions, and 10 to 2000 mg/liter of transition ions as a first etching step, and then subjecting said foil to a second etching step.

2. A process according to claim 1 wherein said anodizing anion acid is present in greater concentration than said hydrochloric acid.

3. A process according to claim 2 wherein said anodizing anions are sulfate or phosphate.

4. A process according to claim 1 wherein said transition ions are at least one of cobalt (II), nickel (II), or copper (II).

5. A process according to claim 1 wherein said first etching step is carried out at a temperature of between 70° C. and the boiling point of said solution for a period of time sufficient to obtain a foil weight loss of 5 to 25%.

6. A process according to claim 5 wherein said etching is carried out at 85° to 90° C. for 65 to 85 seconds.

7. A process according to claim 1 wherein said solution is an aqueous solution containing 1.4 to 2.3 moles/liter sulfuric acid, 1.1 to 1.7 moles/liter hydrochloric acid, 600 mg/l nickel (II) ion, and 0.3 moles/liter aluminum ion.

8. A process according to claim 1 wherein said second stage etching is an electrochemical etch using direct current and an aqueous chloride electrolyte.

9. A process according to claim 1 wherein said second stage etching is a chemical etch using 0.5 to 6.0M aqueous nitric acid bath containing 0 to 200 mg/l transition metal, said bath having a temperature of 70°0 to 100° C.

10. A process according to claim 1 wherein said second stage etch is carried out until the total weight loss of said foil is 20 to 50%.

* * * * *